Jan. 27, 1959 J. FÉNART 2,870,865
METHODS OF SATURATING A LIQUID WITH CARBONIC ACID
Filed Aug. 23, 1954 2 Sheets-Sheet 1

INVENTOR
Jean Fenart
by Wenderoth, Lind & Ponack
ATTORNEYS

United States Patent Office 2,870,865
Patented Jan. 27, 1959

2,870,865

METHODS OF SATURATING A LIQUID WITH CARBONIC ACID

Jean Fènart, Issy-les-Moulineaux, France, assignor to Etablissements Fenart-Bouguet-Pau, Bas-Meudon, France, a society of France Application August 23, 1954, Serial No. 451,667

Claims priority, application France August 28, 1953

1 Claim. (Cl. 183—114)

This invention relates to methods of saturating water or other liquids with carbonic acid while simultaneously de-aerating these liquids.

It is known that the difficulties experienced when attempting to saturate a liquid with carbonic acid are due chiefly to the presence of air in both substances.

It is hardly possible to carry out any process of this kind on a convenient industrial basis unless apparatus are used which, from the beginning to the end of the run, yield a fairly constant product having a practically unvarying carbonic acid content at any time, irrespective of the variations occurring in the percentage of air trapped in either the liquid or the acid substances, for even in absorption tubes containing liquified carbonic acid the air content may vary as much as from 0% to 12% from the beginning to the end of the tube.

Therefore, means are required for permanently and regularly removing from the very beginning of the run any air dissolved in the liquid and contained in the carbonic acid, this removal occurring necessarily during the saturation process, without resorting to either costly cleaning plants or unduly large saturating apparatus of prohibitive cost price.

The present invention provides a novel method of saturating water or other liquids with carbonic acid, which comprises the steps of passing the liquid to be treated in counter-current relationship to carbonic acid through a plurality of serially arranged elements wherein said liquid is gradually enriched with carbonic acid while any air trapped therein is exhausted continuously, the carbonic acid and air mixture being enriched at the same time with air dissolved in the liquid and releasing carbonic acid as the mixture flows to the discharge end of the serially arranged elements, where an adjustable drain cock is provided for venting the air to the atmosphere.

The apparatus for carrying out the method of this invention comprises in a housing a plurality of elements arranged in series with one another and connected in parallel with the supply of liquid to be treated, these elements being provided with injectors adapted, in combination with an adjustable drain cock placed at the end of the carbonic acid path, to cause the carbonic acid to be thoroughly mixed with the liquid.

In order to afford a clearer understanding of the manner in which the invention may be practised, reference will now be made to the affixed drawings showing by way of example one form of embodiment of an apparatus for carrying out the method of the invention. In the drawings.

Figure 1:
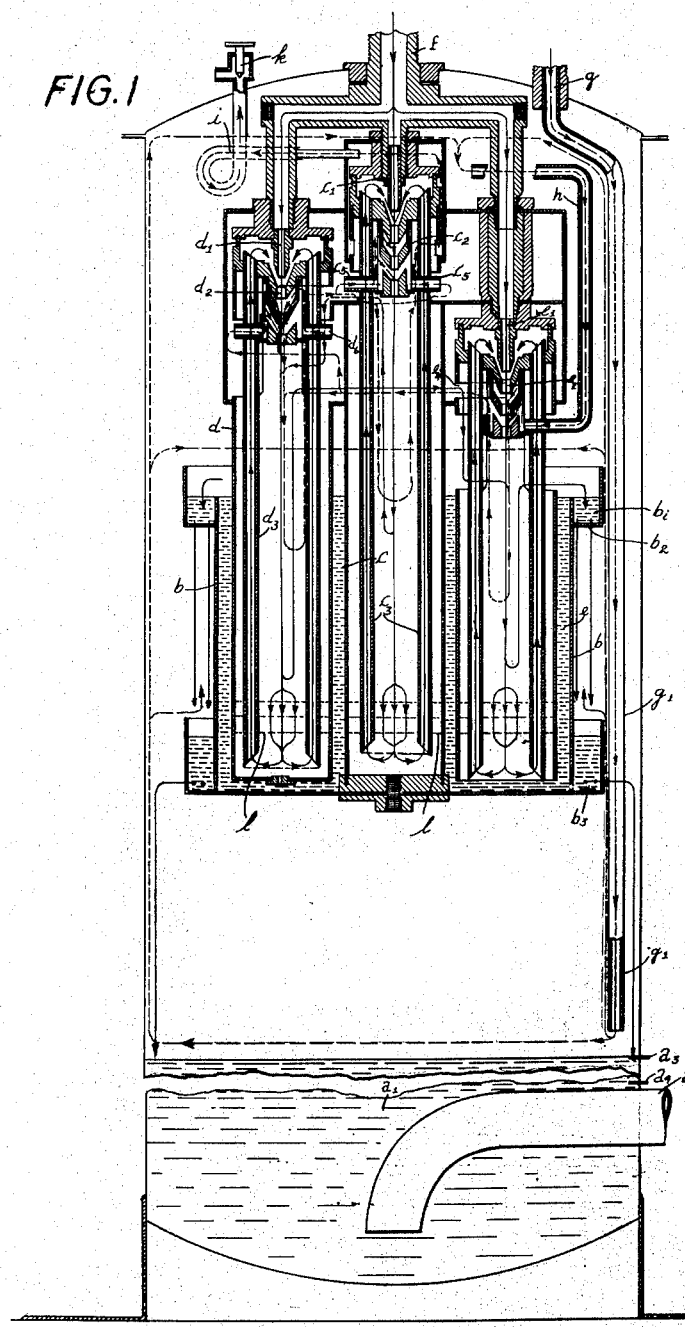
Fig. 1 is a vertical axial section of the saturator and de-aerator apparatus according to this invention.

The apparatus shown in the drawings comprises a vertical housing or column $a$, a vat $b$ mounted in the upper portion of this housing and having located therein vertically and side-by-side three substantially identical tubular elements $c$, $d$, $e$ constituting the three successive stages in which the liquid is saturated with carbonic acid.

The water or other liquid to be saturated with carbonic acid is fed continuously at superatmospheric pressure to the upper portion of the apparatus from suitable pump means (not shown) through an inlet fitting $f$ connected in parallel with a three-branch manifold having branches connected to the aforesaid elements $c$, $d$, $e$ respectively; each of the elements $c$ (first stage of saturation) and $d$ (second stage of saturation) are adapted to process a volume of liquid corresponding to one-fourth of the total output of the aforesaid pump means, whilst the other element $e$ is dimensioned and adapted to treat one-half or the remaining portion of this volume.

Carbonic acid is fed into the column $a$ through an inlet fitting $g$ and flows down the pipe $g_1$ having its lower end positioned some distance below the bottom of the vat $b$; then the carbonic acid flows upwards around this vat and penetrates into the elements $c$, $d$, $e$ where it contacts the liquid to be treated.

In the attached drawings the paths followed by the liquid are shown in thin, unbroken lines, whilst the carbonic acid paths are shown in broken lines; the directions of these paths are shown in both cases by arrows.

Figure 2:
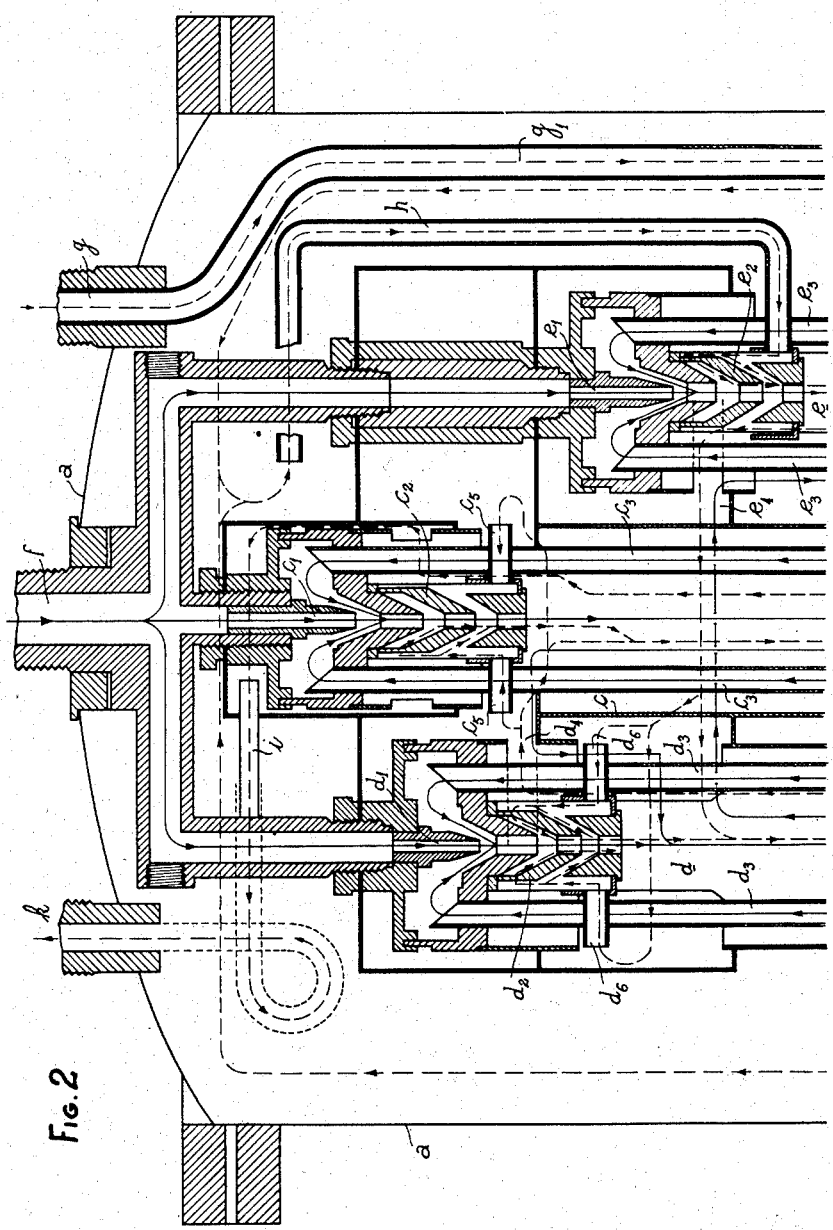
Fig. 2 is a view similar to Fig. 1 but showing at a greater scale only the upper portion of the apparatus.

The carbonic acid flows firstly through element $e$ (third stage), then through element $d$ (2nd stage) and element $c$, that is in counter-current flow with respect to the stream of liquid to be saturated, as will be explained more in detail presently:

One portion of the liquid to be saturated is fed under pressure into element $c$ (1st stage) and through a nozzle $c_1$, flows through an injector system $c_2$, down the cylindrical body of element $c$; then one portion of the liquid flows upwards through pipes $c_3$ and again through the injector system $c_2$, this cycle being repeated while another portion of the liquid passes around pipes $c_3$ and through holes $d_4$ (Fig. 2) formed at the upper portion of both elements $c$ and $d$, and is fed to the element $d$ (2nd stage).

In this stage $d$, the liquid from the 1st stage $c$ and more or less loaded with carbonic acid, is mixed with the liquid supplied by the pump means into this element $d$ through a nozzle $d_1$ and the injector system $d_2$; the liquid flows down the cylindrical body of element $d$; then one portion of the liquid flows upwards through pipes $d_3$ and again through the injector system $d_2$ to repeate this cycle, while the other portion of the liquid is fed to element $e$ (3rd stage) by passing down and up between the pipes $d_3$ through holes $e_4$ (Fig. 2) formed between the elements $d$ and $e$ and around element $c$, above the vat $b$.

Figure 3:
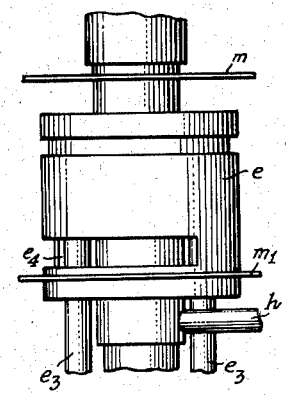
Figure 3 is a side elevation of element $e$.

The ports $e_4$ by which the liquid coming from the element $d$ penetrates into the element $e$ are particularly shown in Figure 3, $m$ and $m_1$ being the dripping plates for the flowing liquid.

In this element $e$, the liquid, already more or less loaded with carbonic acid and issuing from the first and second stages $c$ and $d$, is mixed with the last and most substantial fraction of untreated liquid fed under superatmospheric pressure into this element $e$ by the pump means through the nozzle $e_1$ and injector system $e_2$; thus, the total amount of liquid will flow down the cylindrical body of this element $e$, and subsequently one portion of this liquid will be directed upwards through pipes $e_3$ and fed again to the injector system for re-cycling in this element, while another portion from the cylindrical body of element $e$ overflows at $d_5$ (Fig. 1) into an annular chamber $b_1$ provided around the upper portion of vat $b$, as shown.

The bottom of this annular chamber $b_1$ is perforated at $b_2$ and the liquid drips externally of vat $b$ and is collected in another annular chamber $b_3$ surrounding the lower portion of vat $b$. As the liquid drips down it is again caused to contact the carbonic acid supplied directly from pipe $g_1$ and fed thereby to the intermediate portion of column $a$ under the vat $b$. This dripping contact zone constitutes the fourth stage of the treatment of the liquid with carbonic acid, and enables the gaseous equilibrium to be completed in that portion of the column where the gas has its highest carbonic acid content, since it has not yet absorbed the air contained in the liquid to be treated, while its air content itself has not increased proportionally.

Reverting now to the path followed by the carbonic acid in the apparatus, it will be seen, as shown in broken lines in the drawings (Fig. 1), that one portion of the gas issuing from pipe $g_1$ travels upwards around the vat $b$ and around its inlet pipe $g_1$ up to the upper portion of the column; then, this gas portion is fed through a pipe $h$ to the injector system $e_2$ of element $e$ (i. e. the 3rd stage of the apparatus) while another portion of this gas flows directly, around the pipes $e_3$, through the open portion of element $e$ and beneath the injector system $e_2$ into the inner cylindrical body of this element $e$. Consequently, due to the recurrent and fast circulation of the liquid contacting the gaseous flow in counter-current relationship, as produced in this element $e$ from the provision of the injector system $e_2$, the treated liquid is impregnated with carbonic acid while one portion of the air content of this liquid is absorbed by the gaseous stream and the latter has its air percentage increased during this operation.

That portion of the carbonic acid which has not been absorbed by the treated liquid in the 3rd stage $e$ of the process will flow upwards and externally of the injector system $e_2$ of this stage $e$ and also around the 1st stage $c$; one portion of the gaseous stream will flow through inlet fittings $d_6$ into the injector system $d_2$ of the 2nd stage $d$, and another portion of the gaseous stream will flow directly, around the pipes $d_3$, through the open portion of element $d$ beneath the injector system $d_2$, into the inner cylindrical body of this element $d$. Due to the recurrent and fast circulation of the liquid contacting the gaseous flow in counter-current relationship, as produced in this element by the injector system $d_2$, the liquid will be impregnated with carbonic acid and a subsequent proportion of its air content will be transferred to the carbonic acid stream, whilst increasing still further the air percentage of the gaseous mixture proper.

The carbonic acid still present in the gaseous mixture and unabsorbed by the liquid in this 2nd stage $d$ will flow upwards and externally of the injector system $d_2$ of this stage, and pass through openings $d_4$, so as to surround the first stage $c$, as will be apparent from the drawings; one portion of this gaseous stream will flow directly around the pipes $c_3$ through the open portion of this element $c$, beneath the injector system $c_2$ thereof, into the cylindrical body of this element $c$, and another portion of this gaseous stream will flow through the fittings $c_5$ into the injector system $c_2$. Obviously, this injector system will produce a recurrent and fast circulation of the liquid fed directly from the supply pump (not shown) and contacting the gaseous mixture consisting in this last stage:

(a) of the air released by the liquid, (b) of the air originally contained by the $CO_2$ and still undissolved in the preceding stages, (c) of any $CO_2$ undissolved on account of its air content; at this last stage the liquid will absorb the carbonic acid yet remaining in the gaseous mixture and release the dissolved air which it still contains, the proportion of the components of the gaseous mixture being once more and for the last time modified, as the air percentage of the mixture is increased and its $CO_2$ content extremely low.

The carbonic acid together with air issuing from this stage $c$ flows upwards externally of the injector system $c_2$ thereof and is finally collected by a pipe $i$ leading to a drain-cock $k$ (shown diagrammatically only).

From the foregoing it will be apparent that as the liquid flows through the three stages $c$, $d$, $e$, and through the dripping zone externally of the vat $b$, it will gradually be impregnated with pure carbonic acid and have its air content increased accordingly.

The carbonic-acid saturated liquid falls from the annular collecting chamber $b_3$ surrounding the bottom of vat $b$ into the lower portion $a_1$ of column $a$ and is finally discharged therefrom through a conduit $a_2$; the rate at which the gasified liquid is collected at the bottom of column $a$ is adjustable through any known or suitable means, for example a pair of electrodes $a_3$ and $a_4$ located at the uppermost and lowermost liquid levels respectively and connected to an electric circuit controlling the liquid supply pump (not shown); thus, the pump operation is discontinued when the liquid level attains the upper electrode $a_3$ and restored when the liquid level falls to the lower electrode $a_4$.

Screen means $l$, $l$ are preferably arranged at the lower portion of the cylindrical body of each element $c$, $d$, $e$, to prevent any air bubbles from interfering with the proper operation of the injector system $c_2$, $d_2$, $e_2$, of the various stages.

The air mixed with carbonic acid in the proportion obtained after its passage through the last stage is finally discharged through the drain cock $k$ and the outlet of the apparatus; the rate of output of this drain cock is adjusted in accordance with the amount of parasitic air to be removed; thus, if the drain cock is adjusted for a relatively high throughput, carbonic acid will be lost without any benefit; conversely, if this adjustment is too much throttled, air will accumulate slowly in the column and the liquid will absorb a lesser amount of carbonic acid. With a properly adjusted drain cock the apparatus will normally discharge in continuous operation a gas containing from 50% to 70% of undesired gaseous products. Thus, the loss of pure carbonic acid is kept to a minimum and negligible amount, whilst the elimination of air as hitherto effected with apparatus not designed for rational de-aeration may cause the amount of lost carbonic acid to equal or even exceed the amount actually employed therein.

With the apparatus described hereinabove it is possible to cause the liquid and the carbonic acid to flow along two opposed paths, to create at the main absorption point a fresh gas draft for preventing at this point the accumulation of non-soluble parasitic gases, and to utilize the kinetic energy of the liquid fed under pressure into the column for creating this draft under the best possible conditions of absorption.

From the foregoing, it will be apparent to anybody familiar with the art that the method according to this invention provide novel means for saturating a liquid with carbonic acid and simultaneously de-aerating said liquid in a single, continuous operation.

What I claim is:

A process for saturating a liquid with carbonic acid while at the same time simultaneously deaerating said liquid, wherein said liquid circulates in counter current to said carbonic acid comprising gradually removing the air contained in said carbonic acid and said liquid while at the same time saturating said liquid with carbonic acid by a counter circulation in several successive elements, comprising treating said liquid containing air in a first contact stage with a gaseous mixture high in air content and low in carbonic acid content, then treating said liquid impregnated with carbonic acid and partially deaerated from said first stage in a second contact stage with a gaseous mixture containing air and carbonic acid, the proportion of air in said last named gaseous mixture being less than that in said first named gaseous mixture, and the proportion of carbonic acid being greater than that in said first named gaseous mixture, then treating said liquid having a high content of carbonic acid and a low content of air coming from said second stage in a third stage with a gaseous mixture having a high content of carbonic acid, then treating said liquid having a high content of carbonic acid and a low content of air in a final contact stage with the mixture of carbonic acid and a low proportion of air entering into the circuit, then withdrawing said liquid saturated with carbonic acid and deaerated following said final stage, the gaseous mixture high in air content formed by the air coming from the deaeration of the liquid and the air initially present in the gaseous mixture and containing a slight proportion of carbonic acid being evacuated at the end of the circulation at the exit of said first contact stage by means of an adjustable draincock.

References Cited in the file of this patent

UNITED STATES PATENTS

| | | |
|---|---|---|
| 832,904 | Harris | Oct. 9, 1906 |
| 1,746,873 | Shields | Feb. 11, 1930 |
| 1,799,354 | Chesny | Apr. 7, 1931 |
| 2,020,850 | Myhren et al. | Nov. 12, 1935 |
| 2,549,311 | Hudson | Apr. 17, 1951 |